Patented Jan. 1, 1952

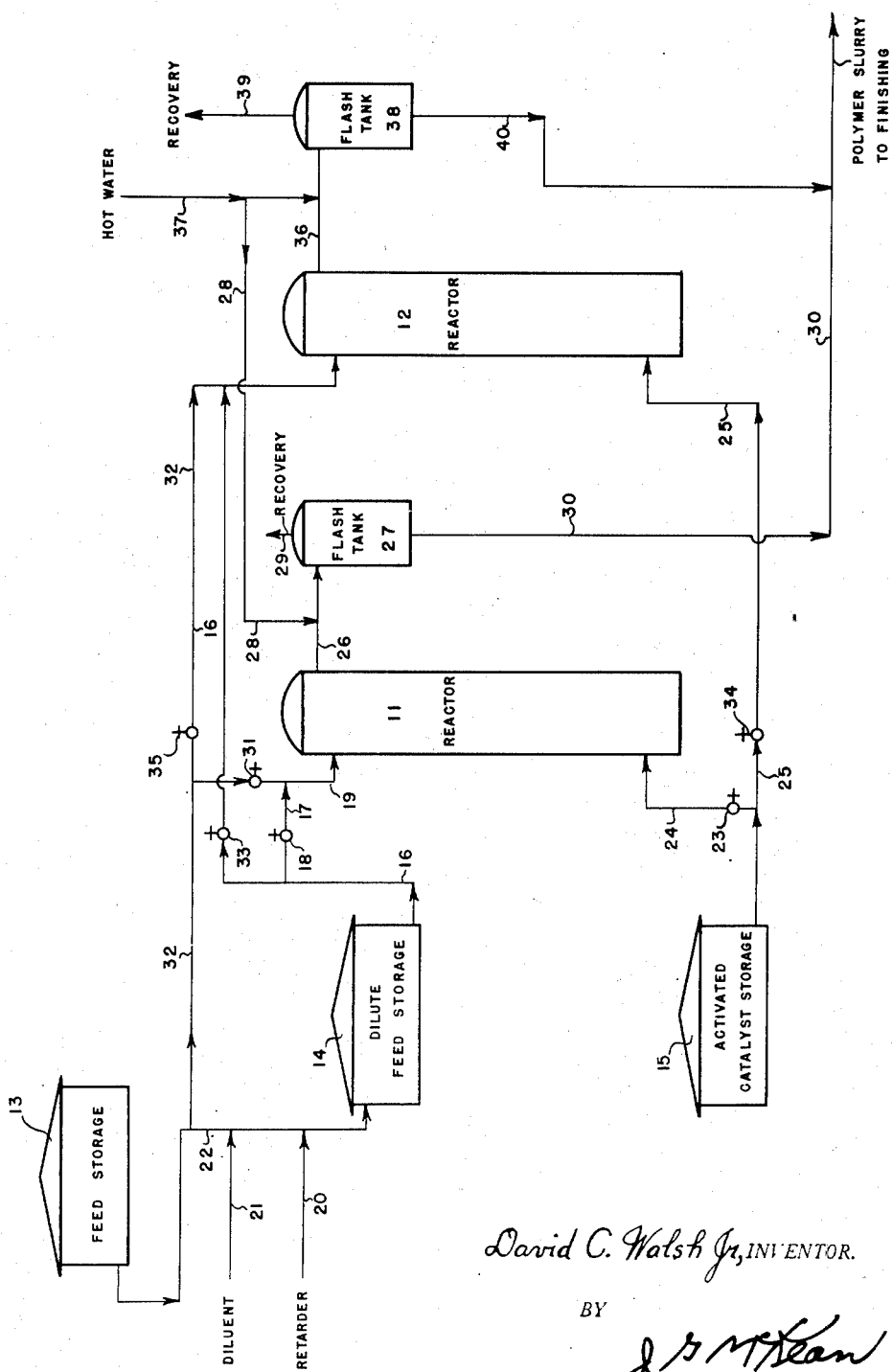

2,580,490

UNITED STATES PATENT OFFICE 2,580,490

METHOD FOR STARTING UP LOW-TEMPERATURE ISOOLEFIN POLYMERIZATION

David C. Walsh, Jr., Baytown, Tex., assignor, by mesne assignments, to Standard Oil Development Company, Elizabeth, N. J., a corporation of Delaware Application January 30, 1948, Serial No. 5,462

4 Claims. (Cl. 260—85.3)

The present invention is directed to a method for polymerizing olefins at subatmospheric temperatures. More particularly, the invention is concerned with a method for starting up and operating a polymerization process in which the polymerization is conducted in a plurality of reactors. The invention is specifically directed to the operation of a plurality of polymerization reactors in which an activated catalyst of a Friedel-Crafts type is employed.

In the production of high molecular weight polymers which are susceptible to vulcanization to produce a product similar to natural rubber in its characteristics, it is customary to polymerize a low molecular weight olefin, such as isobutylene, with a diolefin, such as butadiene or isoprene, at a temperature in the range between —50° and —175° F. The reaction is usually catalyzed by a Friedel-Crafts type catalyst such as an aluminum halide, specifically aluminum chloride dissolved in a suitable solvent for the catalyst. Methyl chloride or other alkyl halides of the type of methyl chloride are suitable as solvents in preparing the catalyst employed in the present invention. Methyl chloride, besides being a suitable solvent for the catalyst, is also employed as a diluent for the hydrocarbon reactants. If a diluent for the reaction were not employed, the hydrocarbons on polymerizing to higher molecular weight products would form viscous solutions which would not readily lend themselves to handling in pumps, lines, and other equipment. Therefore, the use of an alkyl halide, such as methyl chloride, allows the formation of a polymer of the desired quality without resulting in a viscous mass which is difficult to handle.

In starting up and operating a system in which a polymerization reaction of the type mentioned is conducted, it has been customary to employ a dilute feed such as one including, for example, between 5% and 15% by volume of the monoolefin, isobutylene, during the period when the reaction is being initiated. Ordinarily, during the time when the reaction is proceeding normally it has been customary to employ a feed including an amount of isobutylene in the range between 20% and 30% with a preferred amount of about 27%, the remainder being a diolefin such as isoprene, and a diluent for the reaction, such as methyl chloride. The diolefin ordinarily comprises between 0.5 and 2.5% of the tertiary olefin. This reaction is usually conducted at a temperature of approximately —140° F.

The employment of a dilute feed including an amount of isobutylene in the range between 5% and 15% per volume is usually accomplished by adding to the normal feed an amount of substantially pure methyl chloride to dilute the normal feed content of isobutylene to an amount in the range given above, following which, when the critical start-up period is passed, the feed containing the normal amount of isobutylene is substituted for the dilute feed.

The reason it is important to employ a dilute feed during the start-up period is because during initial operations of a reactor in which a low temperature polymerization is conducted, it has been observed that the reaction may proceed nearly explosively with formation of polymer in such masses that the passageways through which the product is handled become easily clogged. It has also been observed that the initial product, when the reaction is allowed to proceed rapidly, may result in the loss of heat transfer by formation on the surfaces exposed to the reaction of a thin film of polymer which gradually builds up to a point where heat transfer is diminished and, consequently, temperatures of the reaction are uncontrollable. For example, if the temperature is not maintained in the range given, a product of inferior quality results. It has been observed that the initiation of the reaction is always coincident with a sharp rise in temperature and rate of reaction. Thus, if a feed stock containing the usual amount of tertiary olefin is employed during the initial period the reaction may become uncontrollable with disastrous results on the operation and product quality. By employing a diluted feed containing substantially less than the normal amount of tertiary olefin, it is possible to control the violent temperature rise and the reaction rate, and thus, continue the reactor in operation.

Prior to the present invention, it has been suggested that the catalytic effect of the catalyst might be activated by addition to the reactant mass of an activator for the catalyst, such as exemplified by hydrogen chloride or a low molecular weight unsaturated polymer such as diisobutylene or the polymer of propylene and the like. Therefore, employment of activated catalyst has made necessary even greater control of the reaction than was required heretofore.

The method of employing a dilute feed during initial operating periods, as described before, is satisfactory when a non-activated catalyst is employed. However, in a system in which the entire catalyst to a plurality of reactors is activated, it is difficult to control the reaction in a given reactor even when employing a dilute feed as has been described. On the other hand, after the initial critical period has been passed, it is desirable to employ an activated catalyst and thus, in effect, if a non-activated catalyst is required during start-up and an activated catalyst during operating periods, dual systems would be necessary for such an operation. Obviously, dual catalyst systems are inconvenient and impractical in commercial operations.

It is, therefore, the main object of the present invention to provide a method whereby a polymerization reaction is conducted employing a dilute feed to which has been added a retarder for the reaction to overcome the effect of the activator during the initial critical start-up period.

Another object of the present invention is to provide a method for operating a plurality of polymerization reactors when employing as a catalyst a Friedel-Crafts type catalyst to which has been added an activator and a retarder for the reaction.

Another object of the present invention is to provide a polymerization process in which a plurality of reactors is employed and in which the reaction is carefully controlled during initial periods of operation.

In accordance with the present invention, control of the low temperature polymerization reaction, such as the polymerization of isobutylene with isoprene, at a temperature in the range between −50° and −175° F. is effected by polymerizing these olefins while employing a Friedel-Crafts type catalyst to which a promoter and a retarder for the reaction has been added, the retarder overcoming the activational effects of the promoter during starting-up periods when very careful control is necessary. In practicing the present invention, the retarder for the reaction is present in substantial amounts only when a dilute feed comprising an amount of isobutylene in the range between 5% and 15% is employed. During normal operating periods, an amount of isobutylene in the feed of approximately 27% is used while the retarder for the reaction is substantially absent.

In conducting the invention, when a reaction of the type mentioned is initiated, a feed mixture comprising isobutylene in an amount of about 5% to 15% in admixture with isoprene and an alkyl halide, such as methyl chloride, is injected into the system. After circulation has been established, it is customary to inject a solution of aluminum chloride in methyl chloride to initiate the reaction. Aluminum chloride dissolved in methyl chloride as a solution containing between 0.05 and 0.5 gram of aluminum chloride per 100 cc. of solution has been found to be an effective catalyst. The hydrocarbons and the catalyst solution are both chilled, prior to initiating the reaction to a temperature in the range between −50° and −175° F., preferably to a temperature of −140° F. During this period, in accordance with the present invention, an amount of catalyst retarder, such as butylene-1 or butylene-2, in the range of about −3% to 15% by volume based on the isobutylene, preferably in the range of 5% to 6%, is injected into the hydrocarbon solution. The presence of butylene-1 or butylene-2 effectively suppresses the runaway tendencies of activated catalyst of the type mentioned before and allows the reaction to proceed under control during the initial start-up period.

The invention will now be described by reference to the drawing in which the single figure represents a flow diagram of one specific mode of practicing the invention.

Referring now to the drawing, numerals 11 and 12, respectively, designate reactors suitable for conducting a polymerization reaction at a low temperature in the range of −50° to −175° F. Reactors 11 and 12 are provided with refrigeration facilities, not shown, for maintaining a temperature within the range given. Reactors 11 and 12 are also provided with a feed storage drum 13, a dilute feed storage drum 14 and an activated catalyst storage drum 15 which are connected to the reactors 11 and 12 in a manner which will be described further. For purposes of illustration, it will be assumed that the reactor 12 is in operation and reactor 11 has been taken off the operating stream, cleaned, and ready for initiation of reaction in accordance with the present invention.

The reactor 11 has charged to it from dilute feed storage drum 14 by way of line 16, branch line 17, controlled by valve 18, and line 19, a dilute feed mixture comprising isobutylene, isoprene, and methyl chloride. The isobutylene content of the mixture in dilute storage feed drum 14 includes isobutylene in the range between 5% and 15%, the remainder of the feed mixture being methyl chloride, a very small percentage of isoprene and a retarder for the reaction, such as butylene-1 or butylene-2. The retarder for the reaction and the diluent therefor are added to dilute feed storage drum 14 by lines 20 and 21 leading into line 22. The retarder, in this instance butylene-1, is admixed in line 22 with the diluent added by line 21 and the hydrocarbons withdrawn from feed storage drum 13 by line 22 and discharged into dilute feed storage drum 14. The butylene-1 content of the mixture in the dilute feed storage drum 14 is maintained in the range between 3% and 15%, based on the isobutylene content of the mixture. A preferred range of butylene-1, based on the isobutylene content of the dilute feed mixture, is in the range of 5% and 6%. As stated before, this mixture, including butylene-1, isoprene, isobutylene, and an alkyl halide such as methyl chloride, is discharged into reactor 11 until the reactor is substantially full. The flow of feed is continued into the reactor and simultaneously activated catalyst from activated catalyst storage drum 15 is introduced into reactor 11 by opening valve 23 and in line 24 connecting into line 25, thus allowing the introduction of activated catalyst into the reactor 11 to cause the initiation of a reaction therein.

The activated catalyst in vessel 15 comprises aluminum chloride dissolved in methyl chloride in a concentration in the range between 0.05 to 0.5 gram of aluminum chloride per 100 cc. of methyl chloride solution, to which has been added an activator for the reaction, such as hydrogen chloride or di-isobutylene or a dimer of propylene. This catalyst mixture is exceedingly active and results in practically immediate initiation of the polymerization reaction in reactor 11. To overcome the deleterious effects which may result from employing exceedingly activated catalyst during the early periods of the reaction, the retarder, that is, butylene-1, suppresses the activational effects of the promoter and allows the reaction to proceed in reactor 11 past the critical starting-up period where mass fouling has been observed to occur in the past.

Since the feed and the catalyst are introduced continuously to the reactor 11, product is formed continuously in reactor 11 and is removed therefrom by line 26 leading into flash drum 27. Discharging into line 26 is line 28 connecting line 26 to a source of hot water. Introduction of hot water or other fluid, providing a source of heat, is necessary to raise the temperature of the material flowing through line 26 to allow recovery of unreacted materials and diluent therein and to cause a separation between unreacted materials and polymer. These materials, including hot water, which serves as a dispersing and carrying agent for the solid particles and polymer, discharge into flash tank 27 from whence the unreacted vapors may be recovered by line 29 connected to a recovery system, not shown, and the desirable products as a slurry or suspension in the water discharged by line 30 to a conventional finishing system, not shown.

As the operation proceeds, the amount of isobutylene in the reactant mass in reactor 11 is gradually increased by throttling valve 18 in line 17, thus controlling the amount of dilute feed introduced from storage tank 14 and manipulation of valve 31 in line 19 connecting the reactor 11 to line 32 and line 22 to storage tank 13. Thus, in accordance with the present invention, the amount of dilute feed is gradually decreased by throttling valve 18 and the amount of isobutylene is gradually increased by opening valve 31 until the amount of added dilute feed is substantially eliminated and valve 18 reaches a closed position.

The reactor 11 then proceeds in operation with a normal hydrocarbon feed comprising about 27% isobutylene, 2½% isoprene, based on the isobutylene, and the remainder methyl chloride until it is desired to terminate the reaction in reactor 11 and to take the latter out of the system for cleaning or for any other purposes that may be desired.

During the aforementioned period when the reactor 11 is on normal operation, it will be assumed that the reactor 12 had been taken off of the system, cleaned and readied for a new operation. Under these conditions, the reactor 12 would be filled with a dilute feed mixture as described with respect to reactor 11 by opening valve 33 in line 16 connecting with line 32 and allowing the reactor 12 to be filled with a dilute feed, including diluent and retarder for the reaction. Activated catalyst from activated catalyst storage drum 15 is then slowly fed into the reactor 12 by opening valve 34 in line 25, thus allowing initiation of the reaction. Similar to the operation with respect to reactor 11, the operation proceeds and is carefully controlled in reactor 12. The amount of retarder in the reactant mass in reactor 12 is slowly decreased by throttling of valve 33 in line 16 and by opening valve 35 in line 32 connecting the reactor 12 to feed storage tank 13 containing the normal amount of isobutylene and isoprene. Thus, it will be seen that the amount of dilute feed containing retarder is progressively decreased and the amount of isobutylene is progressively increased as the reactor 12 is gradually brought onto operating conditions. Similar to the operation with respect to reactor 11, the product, including a polymer in a finely divided condition, flows from the reactor 12 by line 36 and has added to it hot water or other aqueous medium introduced by line 37 connecting into lines 36 and 28. The mixture of water and polymer-carrying stream flows into a flash tank 38 from which the unreacted materials are recovered in vaporous form by line 39 connected to a recovery system, not shown. The solid products, including polymer dispersed in the aqueous medium, flow from flash tank 38 by line 40 into line 30 which connects to a finishing system, not shown.

It will be understood in the operation described with respect to the drawing that when one of the reactors 11 or 12 is on initial operations, the other of the reactors 12 or 11 may be on equilibrium conditions, that is, conditions under which maximum amounts of products meeting the required quality are produced. It will also be understood that while only two reactors have been described in the operation in conjunction with the drawing, a plurality of reactors including three or four or more reactors may be similarly operated.

The activated catalyst in catalyst storage drum 15 contains exceedingly small quantities of catalyst activators, such as hydrogen chloride or di-isobutylene or a propylene dimer. The amounts of activators of the type described are exceedingly small and it is extremely difficult to measure the activational quantities required for the reaction. Consequently, it is impractical to introduce into either of the reactors 11 or 12 individual quantities of the desired promoter or activator for the reaction. Therefore, when employing in accordance with the present invention a catalyst which is activated, it is desirable to prepare a quantity of catalyst to which the stated amount of catalyst activator has been added. When hydrogen chloride is the activator for the catalyst, it should be employed in an amount in the range from about 1 to about 10 parts per million based on the solvent, for example, methyl chloride, in the catalyst solution. An amount in the range from about 3 to 7 parts per million gives satisfactory results. When di-isobutylene is the activator, it should be used in an amount in the range between 1 and 75 parts per million based on the total feed with an amount in the range between 15 and 40 parts per million usually being satisfactory.

In order to illustrate further the beneficial aspects of the present invention, a number of runs were made in which a polymerization reaction was conducted employing, in one instance, a catalyst which did not contain an activator, and in another instance, a catalyst containing an activator in the amount of 5.5 parts per million of hydrogen chloride. The catalyst comprised a solution of aluminum chloride in methyl chloride. These catalysts were employed to polymerize a mixture including isobutylene, isoprene, and an alkyl halide such as methyl chloride. Several amounts of catalyst in each instance were employed to vary the amount of polymer produced. These runs were conducted at a temperature of −140° F. The results of these runs, showing the amount of catalyst added with relation to the amount of polymer produced, are presented in Table I:

*Table I*

| Catalyst Added, Parts of AlCl$_3$ | Polymer Produced, Parts | |
|---|---|---|
| | Normal Catalyst | Activated Catalyst [1] |
| 0.037 | 71 | 95 |
| 0.052 | 100 | 154 |
| 0.074 | 127 | 201 |

[1] Catalyst contained 5.5 parts per million hydrogen chloride.

It will be apparent from the foregoing data that the activated catalyst allowed production of increased amounts of polymer over that producible with the normal catalyst to which no activator had been added. Furthermore, while not reflected by the data in Table I, the reaction rate for the activated catalyst was substantially greater than that for the normal catalyst.

In order to illustrate the retarding effect of butylene-1 similar runs to that described above were conducted using varying amounts of catalyst. In these runs a normal catalyst to which no activator had been added was employed. In one series of runs, the reactant mixture contained 2.5% of butylene-1 based on the isobutylene content, and in the second instance, the reactant mixture contained 4.8% butylene-1, based on the isobutylene content of the mixture. The runs were conducted at substantially the same temperature as the aforementioned runs. Several runs were made with the two feeds containing different amounts of butylene-1 employing varying amounts of aluminum chloride as catalyst. The results of these runs are presented in Table II.

*Table II*

| Catalyst Added, Parts of AlCl₃ | Polymer Produced, Parts | |
| --- | --- | --- |
| | 2.5% Butylene-1 [1] | 4.8% Butylene-1 [1] |
| 0.050 | 34 | 19 |
| 0.080 | 69 | 43 |
| 0.100 | 82 | 55 |
| 0.200 | 134 | 95 |

[1] Based on isobutylene content of feed.

It will be apparent from the data presented in Table II that increasing the amount of butylene-1 from less than 3% to approximately 5% resulted in the formation of substantially less polymer than was produced when the amount of butylene-1 was held below 3%. Increasing the amount of catalyst while holding the butylene-1 content constant at about 5% also resulted in substantially less polymer production than when the butylene-1 content was held below 3%.

From the foregoing, it will be apparent that the butylene-1 content of the mixture should be maintained above about 3% and it has been observed that the butylene-1 content should not be allowed to exceed 15%, based on the isobutylene content, since butylene-1 in amounts greater than 15% results in the production of polymers of impaired quality.

While the invention has been described and illustrated by examples in which isobutylene has been used as the tertiary mono-olefin, it is to be understood that other tertiary mono-olefins such as isopentylene, isoheptylene, and isohexylene may also be employed in lieu of isobutylene. Similarly, other diolefins besides isoprene may be used. For example, butadiene and the higher members of the same homologous series may be used in lieu of isoprene. The normal mono-olefin employed as a retarder for the reaction is preferably one having the same number of carbon atoms as the tertiary mono-olefin. For example, when isobutylene is the tertiary olefin, butylene-1 or butylene-2 will be used as the retarder for the reaction. Similarly, when isopentylene is the tertiary mono-olefin, pentylene-1 or pentylene-2 may be used. It is within the purview of my invention, however, to use a tertiary mono-olefin such as isobutylene as a reactant and to use a normal mono-olefin such as pentylene-1 as the retarder for the reaction. In other words, it is not necessary that the retarder hydrocarbon have the same number of carbon atoms as the tertiary mono-olefin comprising one of the reactants.

The nature and objects of the present invention having been completely described and illustrated, what I wish to claim as new and useful and to secure by Letters Patent is:

1. A method for polymerizing olefins at a subatmospheric temperature to produce a vulcanizable polymer which comprises forming a first mixture of a tertiary mono-olefin and a diolefin in an alkyl halide diluent, the amount of tertiary mono-olefin in the mixture being in the range from 5 to 15% and the diolefin being in the range between 0.5 and 2.5% based on the tertiary mono-olefin and the remainder alkyl halide, adding to the mixture a normal mono-olefin in an amount between 3 and 15% based on the tertiary mono-olefin, chilling the mixture to a temperature in the range between −50° and −175° F., subjecting the chilled first mixture to contact with a Friedel-Crafts type catalyst dissolved in an alkyl halide solvent to cause a polymerization reaction, said Friedel-Crafts type catalyst containing an activational amount of a promoter for the reaction, forming a second mixture of a tertiary mono-olefin and a diolefin in an alkyl halide diluent, said tertiary mono-olefin in said second mixture being in the range from about 20% to 30% of the mixture and said diolefin being in the range from about 0.5 to 2.5% based on the tertiary mono-olefin, and the remainder alkyl halide, chilling said second mixture to a temperature in the range between −50° to −175° F., adding said second mixture to said first mixture in gradually increasing amounts while addition of said first mixture is gradually decreased.

2. A method in accordance with claim 1 in which the tertiary mono-olefin is isobutylene, the normal mono-olefin is normal butylene, and the diolefin is isoprene.

3. A method for operating a plurality of reactors in which olefins are polymerized at a subatmospheric temperature to form a vulcanizable polymer which comprises forming a first feed mixture of a tertiary mono-olefin and a diolefin in an alkyl halide diluent, said tertiary mono-olefin being employed in an amount in the range between 5% and 15% and said diolefin being employed in an amount in the range between 0.5% and 2.5% based on the tertiary mono-olefin and the remainder alkyl halide, adding to the first mixture a normal mono-olefin having the same number of carbon atoms as the tertiary mono-olefin, chilling the mixture to a temperature in the range between −50° and −175° F., contacting the chilled mixture with a Friedel-Crafts type catalyst dissolved in an alkyl halide solvent to which has been added an activational amount of an activator for the reaction to cause polymerization of said tertiary mono-olefin and diolefin in a first reaction zone, forming a second feed mixture comprising a tertiary mono-olefin and a diolefin in an alkyl halide diluent, said tertiary mono-olefin in said second mixture being in the range between 20% and 30% and said diolefin being in the range between 0.5 and 2.5% based on the tertiary olefin and the remainder alkyl halide, adding said second mixture to said first mixture in said first reaction zone in gradually increasing amounts while gradually decreasing said first mixture to establish equilibrium conditions, polymerizing said second mixture in a second of a plurality of said reaction zones in the presence of said Friedel-Crafts catalyst containing an activational amount of an activator for the reaction after establishing equilibrium conditions therein and recovering from said first and second reaction zones a vulcanizable polymer.

4. A method in accordance with claim 3 in which said mono-olefin is isobutylene, said normal mono-olefin is normal butylene, and said di-olefin is isoprene.

DAVID C. WALSH, Jr.

REFERENCES CITED

The following references are of record in the file of this patent:

UNITED STATES PATENTS

| Number | Name | Date |
|---|---|---|
| 2,296,399 | Otto | Sept. 22, 1942 |
| 2,384,916 | Holmes | Sept. 18, 1945 |
| 2,444,848 | Purvin | July 6, 1948 |